United States Patent

Scheiter

[15] 3,682,020
[45] Aug. 8, 1972

[54] TRACTION-DRIVE TRANSMISSION

[72] Inventor: Milton H. Scheiter, Bloomfield Hills, Mich.

[73] Assignee: General Motors Corporation, Detroit, Mich.

[22] Filed: Oct. 20, 1970

[21] Appl. No.: 82,364

[52] U.S. Cl. .................................74/772, 74/781
[51] Int. Cl. ........................F16h 15/56, F16h 57/10
[58] Field of Search.................74/796, 781, 772, 755

[56] References Cited

UNITED STATES PATENTS

| 889,181 | 5/1908 | Davis | 74/755 |
|---|---|---|---|
| 956,227 | 4/1910 | Tabler | 74/772 |
| 1,933,424 | 10/1933 | Forsyth | 74/781 R |
| 2,270,536 | 1/1942 | Lenning | 74/781 R |
| 2,398,839 | 4/1946 | Moffitt | 74/781 R |
| 2,409,506 | 10/1946 | McFarland | 74/781 R |
| 3,181,393 | 5/1965 | Jandasek | 74/781 R |
| 3,252,355 | 5/1966 | Hewko | 74/796 |
| 3,283,614 | 11/1966 | Hewko | 74/798 |
| 3,090,251 | 5/1963 | Snyder | 74/781 R X |
| 3,277,746 | 10/1966 | Forster et al. | 74/781 R X |

Primary Examiner—Carlton R. Croyle
Assistant Examiner—Thomas C. Perry
Attorney—Warren E. Finken, A. M. Heiter and John P. Moran

[57] ABSTRACT

A transmission including input and output shafts, a traction-drive type planetary unit having a ring member driven by the input shaft, planet pinions rotatably supported on a carrier which drives the output shaft, one of a pair of split sun members freely mounted on the output shaft, the other sun member freely mounted on a cylindrical hub extending from the first sun member, axial loader means for moving the freely mounted sun member as required to load contacting surfaces between the planetary components in response to torque loads on the output shaft, a one-way brake for grounding the sun members to produce a predetermined output speed reduction, and a friction clutch for interconnecting the carrier and ring members for direct drive between output and input shafts.

2 Claims, 3 Drawing Figures

INVENTOR.
Milton H. Scheiter
BY
John P. Moran
ATTORNEY

| 44 | 110 | SPEED RATIO |
|---|---|---|
| ENGAGED | DISENGAGED | 1.000 |
| DISENGAGED | ENGAGED | .659 |

INVENTOR.
Milton H. Scheiter
BY John P. Moran
ATTORNEY

TRACTION-DRIVE TRANSMISSION

This invention relates to transmissions and more particularly to roller traction-drive type transmissions.

It is desirable at times to utilize a transmission device for automotive and/or on-board ship accessory drives, and the like, wherein the principal requirement is for a specific fixed-reduced speed ratio, but wherein a direct drive is available when needed.

Accordingly, an object of the invention is to provide an improved two-speed traction-drive type transmission normally having a reduced output/input speed ratio, with direct drive being available through the application of a clutch.

Another object of the invention is to provide an improved two-speed friction-drive mechanism wherein a sun member is grounded by a one-way brake, with the ring member being driven by the input shaft and the planet carrier serving to drive the output shaft at a reduced speed, and including a friction clutch adapted to lock up the carrier and the ring members such that the output shaft is driven directly by the input shaft therethrough.

These and other objects and advantages of the invention will be apparent when reference is made to the following description and accompanying drawings, wherein.

Figure 1:
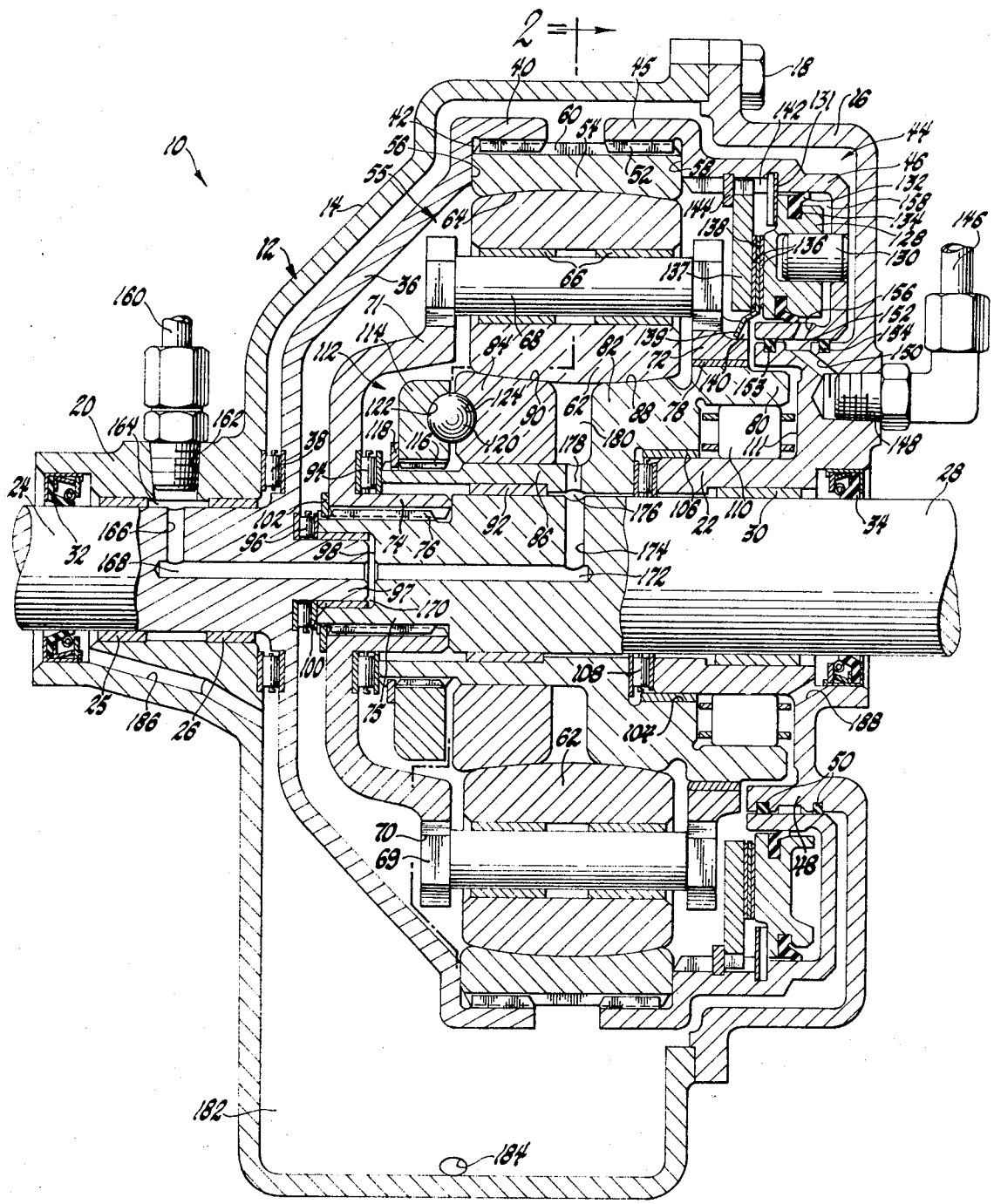
FIG. 1 is a cross-sectional view of a traction-drive transmission embodying the invention.

Referring now to the drawings in greater detail, FIG. 1 illustrates a roller traction-drive mechanism 10, including a housing assembly 12 having a front housing 14 and a rear housing 16 connected together by bolts 18. An outwardly extending hub 20 is formed on the front housing 14, while an inwardly extending hub 22 is formed on the rear housing 16. An input shaft 24 extends into the front housing 14 through bearings 25 and 26 mounted in the hub 20, while an output shaft 28 extends from the rear housing 16 through bearings 30 mounted in the hub 22, the output shaft 28 being axially aligned with the input shaft 24. Seals 32 and 34 are mounted between the shafts 24 and 28, respectively, and the respective front and rear hubs 22 and 26, exterior of the bearings 26 and 30, preventing leakage therepast.

A flange member 36 is formed on the input shaft 24 just inside the wall of the front housing 14. A thrust bearing 38 is mounted between the flange member 36 and the front housing 14. A cylindrical element 40 is formed on the outer edge of the flange member 36, having inwardly extending splines 42 formed thereon. A friction clutch mechanism 44 includes a second cylindrical element 45 formed on an annular clutch housing 46, the latter rotatably mounted on a collar 48 formed on the rear housing 16. Seals 50 are mounted between the collar 48 and the annular clutch housing 46. Inwardly extending splines 52 are also formed on the second cylindrical element 45.

Figures 2, 3:
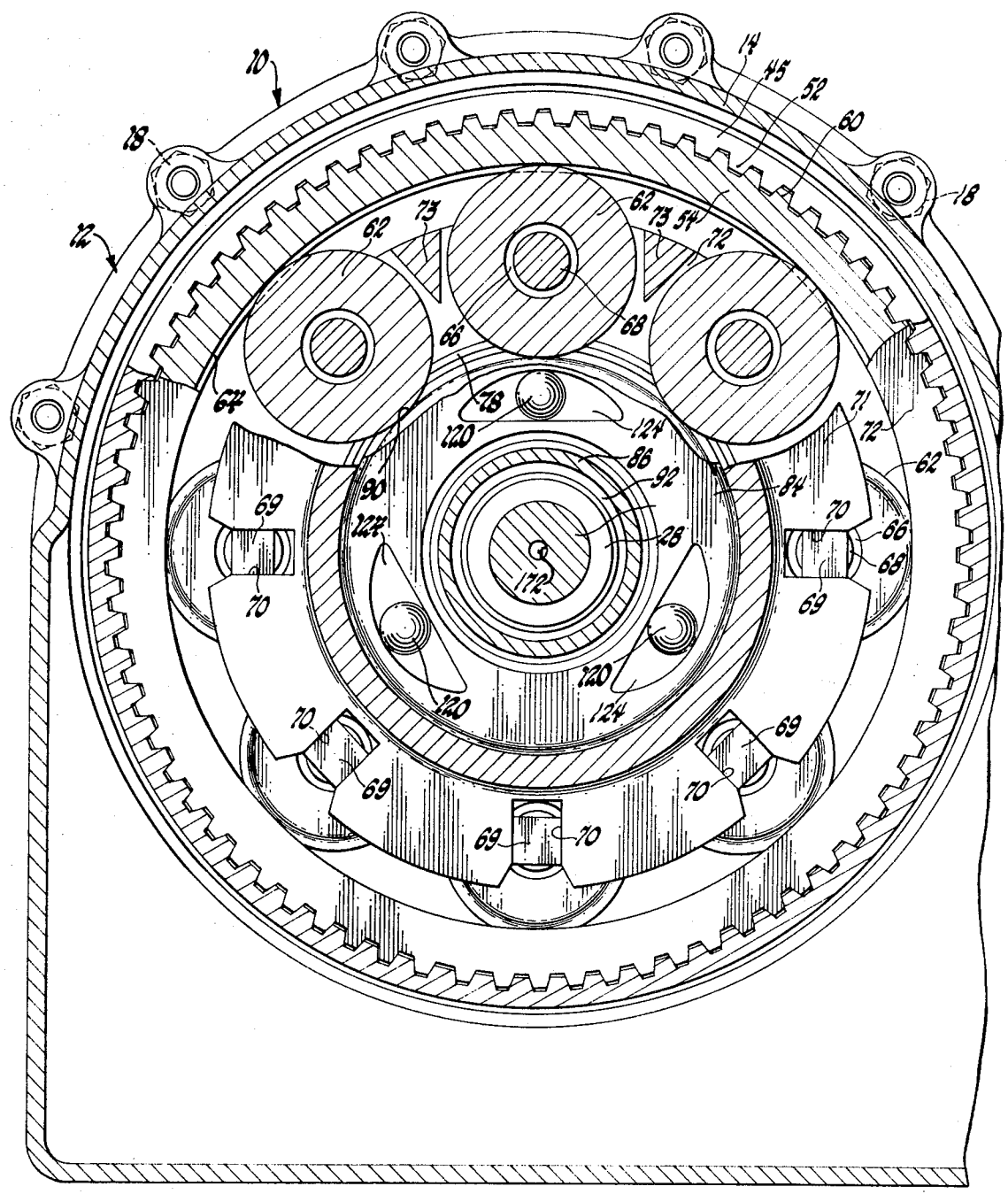
FIG. 2 is a cross-sectional view taken along the plane of line 2—2 of FIG. 1, as if FIG. 1 were a full round view, and looking in the direction of the arrows.
FIG. 3 is a tabulation illustrating characteristics of the invention.

A ring member 54 of a planetary unit 55 is secured to the cylindrical elements 40 and 45 between shoulders 56 and 58 formed thereon by splines 60 interconnected with the splines 42 and 52. A plurality of contoured planet pinions 62 are rotatably mounted adjacent the arced inner surface 64 of the ring 54 on bearings 66 surrounding planet pinion shafts 68, the latter having square cross-sectional ends 69 (FIG. 2) formed thereon for mounting in slots 70 (FIG. 2) formed in front and rear carrier end plates 71 and 72, the latter plates being connected together by ribs 73 (FIG. 2).

The carrier end plate 71 is secured at its hub 74 to a smaller diameter innermost end portion 75 of the output shaft 28 by splines 76, while the carrier end plate 72 is rotatably mounted on a bearing 78 on a rearwardly extending cylindrical drum 80 formed on a first or rear split sun member 82. The other or front split sun member 84 is slidably and rotatably mounted on a frontwardly extending cylindrical hub 86 formed on the sun member 82, and located radially inward of the cylindrical drum 80. Contoured outer surfaces 88 and 90 are formed on the respective sun members 82 and 84 for frictional contact with the contoured planet pinions 62.

The cylindrical hub 86 is rotatably supported on the output shaft 28 by a bearing 92. A thrust bearing 94 is mounted between the end face of the hub 86 and the front carrier plate 71. Another thrust bearing 96 is mounted between the end face of the end portion 75 of the output shaft 28 and a face of the flange member 36 adjacent a reduced diameter end portion 97 of the input shaft 24. A central recess 98 is formed in the end portion 75 of the output shaft 28. The end portion 97 of the input shaft 24 is rotatably mounted within a bearing 100 mounted in the central recess 98. A retaining ring 102 is secured on the splines 76 at the end of the reduced diameter portion 75 of the output shaft 28 adjacent the outer face of the carrier 71, 72.

A recess 104 is formed in the rear sun member 82 concentric with the cylindrical members 80 and 86. In addition to the hub 86 being rotatably supported on the bearing 92, the rear sun member 82 is supported on the inwardly extending transmission housing hub 22 by a bearing 106 inserted in the recess 104, the hub 22, in turn, being rotatably supported on the output shaft 28 by the bearings 30. A thrust bearing 108 is mounted between the end face of the hub 22 and the bottom of the recess 104. A one-way or overrunning brake 110 is mounted between the drum member 80 and the hub 22 intermediate the bottom of the recess 104 of the rear sun member 82 and an inner face 111 of the rear housing 16.

An axial loader mechanism 112 includes an axial loader plate 114 mounted on splines 116 formed on the hub 86 and restrained at the left (FIG. 1) thereof by a retaining ring 118. A plurality of balls 120 are movably confined between ramp surfaces 122 and 124 formed on the axial loader plate 114 and the front sun member 84 for moving the latter for loading the frictionally contacting surfaces of the planetary unit 55 in response to torque loads on the output shaft 28 at any time.

The clutch mechanism 44, housed in the annular clutch housing 46, includes a piston 128 slidably mounted on a pin 130 in the housing 46. A conventional wavy spring 131 serves to retain the piston 128 in the released position against the centrifugal head caused by rotation. A seal 132 is mounted in an annular groove 134 formed around the piston 128 and in slidable contact with the inner wall of the clutch housing 46.

Clutch discs 136 are formed on adjacent faces of the piston 128 and a reaction plate 137, while a clutch plate 138 is mounted intermediate the discs 136. Tangs or projections 139 are formed on the plate 138 to mesh with a drive spline 140 formed on the carrier end plate 72. The reaction plate 137 is mounted on a spline 142 formed on the housing 46 and is restrained from leftward (FIG. 1) movement by a retaining ring 144.

When direct drive is desired, fluid under pressure, made available from a suitable source (not shown), enters via an inlet passage 146 into an inlet port 148 formed in the rear housing 16. A passage 150 formed through the collar 48 communicates between the inlet port 148 and an annular passage 152 formed around the collar 48. A pair of seals 153 and 154 are mounted on the collar 48 adjacent opposite edges of the annular passage 152 to prevent leakage between the collar 48 and the clutch housing 46. A passage 156 is formed through a wall of the clutch housing 46 adjacent the annular passage 152, communicating with a variable chamber 158 in the housing 46 adjacent the slidable piston 128.

Lubrication for the traction-drive mechanism 10 is provided via an inlet passage 160, through an inlet port 162 formed in the outwardly extending hub 20 of the front housing 14, into the annular space 164 intermediate the bearings 25 and 26, providing lubrication for the latter, as well as for the thrust bearing 38. A radial passage 166 is formed in the input shaft 24, communicating between the bearings 25 and 26 and an axial passage 168, the latter, in turn, communicating between the radial passage 166 and a chamber 170 intermediate the adjacent faces of the respective input and output aligned shafts 24 and 28, providing lubricant for the bearing 100 and the thrust bearing 96.

An axial passage 172 is formed in the output shaft 28, extending from the bottom of the central recess 98 formed in the reduced diameter end portion 75, to radial passages 174, the latter communicating with the annular space 176 existing between the output shaft 28 and the cylindrical hub 86 to provide lubricant to the bearings 92, 94, 108, 106 and 30. Passages 178 are formed radially through the cylindrical hub 86, the axes thereof being on the plane of the cross section of the output shaft 28 through the axes of the radial passages 174. Hence, lubricant from the passages 174 will be projected outwardly under the action of centrifugal force, through the space 176, the opening 178 and thence through the space 180 intermediate the split sun members 82 and 84, to lubricate the contacting surfaces between the sun members 82, 84 and the planet pinions 62 and between the latter and the ring member 54.

Lubricant, which will have reached the thrust bearings 38, 94 and 108, as well as the contacting surfaces of the planetary unit 55, will, under the action of centrifugal force, contact the other elements of the transmission 10, such as bearings 66 and 78, as well as the clutch discs 136, before returning to a sump 182 formed at the bottom of the front housing 14. An outlet port 184, formed adjacent the bottom of the front housing 14, serves to permit the lubricant to return to the source (not shown). Passages 186 and 188 formed in the front and rear housing members 14 and 16, respectively, prevent any pressure build-up behind the respective front and rear seals 32 and 34 by directing lubricant to the sump 182.

OPERATION

Clockwise rotation of the input shaft 24, as viewed from the left in FIG. 1, rotates the ring member 54 in a clockwise direction via the flange member 36 and the splines 42, 60. Such rotation of the ring 54 is in the direction to cause the overrunning or one-way brake 110 to restrain the rear sun member 82 at the contacting surface of the cylindrical drum 80. Since the axial loader plate 114 is secured by the splines 116 to the oppositely disposed cylindrical hub 86 of the sun member 82, the axial loader balls 120 will be caused to climb the ramps 122, 124, forcing the front sun member 84 to the right to squeeze the planet pinions 62 between the ring member 54 and the two sun members 82 and 84. The planet pinions 62 will thereupon be rotated clockwise by the ring member 54, thus tending to drive the sun members 82 and 84 in a counterclockwise direction. However, as indicated above, the latter will have become locked up by the one-way brake 110. As a result, the planet pinions 62 will "walk around" the stationary sun members 82 and 84, moving the carrier members 71, 72 and 73 and the output shaft 28 connected to the end plate 71 in a clockwise direction at a predetermined reduced output speed, depending upon the radii selected for the components of the planetary unit 55, a typical output/input speed ratio being 0.659, as indicated in FIG. 3. If the input and output shafts were reversed, for example, the output/input speed ratio would, of course, be increased, rather than decreased.

Assume now that fluid under pressure from a suitable source (not shown) is manually released by an convenient means and directed through the inlet passage 146, the port 148, and the passages 150, 152 and 156 to the variable chamber 158 in the clutch housing 46, to force the piston 128 to the left, causing the engagement of the clutch elements 136 and 138. As a result, the input flange 36, the ring member 54, the clutch housing 46, the engaged clutch elements 136 and 138, the rear carrier end plate 72 via the intermeshed tangs 139 and drive spline 140, the front carrier end plate 71 via the ribs 73, and the output shaft 28 will rotate as a unit, accomplishing the 1.000 output/input speed ratio indicated in FIG. 3. While this is happening, the planet pinions 62 will be rotated in a clockwise direction along with the ring member 54 since the carrier 71, 72 and the ring member 54 are locked together. Such clockwise rotation of the planet pinions 62 will, in turn, rotate the sun members 82 and 84 in a clockwise direction, such direction being permitted by the one-way brake 110.

It should be apparent that various planetary unit radii and different drive and driven members, such as reversing the ring and carrier relationships with the input and output shafts, may be selected to produce output/input speed ratios other than those discussed above. It may also be noted that, since the contacting surfaces are cylindrical, stepped planet pinions could be employed to vary the ratio ranges.

While but one embodiment of the invention has been shown and described in detail, it is apparent that other modifications thereof are possible as indicated above.

I claim:

1. A traction-drive transmission comprising a housing; axially aligned power input and power output shafts rotatably supported in said housing; a planetary unit including first and second axially aligned spaced-apart sun members mounted around said power output shaft, said sun members being axially and rotatably mounted with respect to one another, a plurality of equally spaced planet pinions in frictional contact with said sun members, each of said plurality of planet pinions being rotatably mounted on a planet pinion shaft, carrier means for supporting said planet pinion shafts, said carrier means being secured to said power output shaft, a ring member in frictional contact with said plurality of planet pinions; connector means interconnecting said ring member and said power input shaft; means for loading the frictionally contacting surfaces in response to torque loads; a one-way brake operatively connected between said second sun member and said transmission housing for stopping said sun members in one rotational direction and thereby producing a reduced power output shaft speed; clutch means including a housing secured for rotation with said ring member, a piston slidably mounted in said clutch housing, a plurality of clutch discs for operatively connecting said clutch housing and said carrier means, a source of fluid under pressure, passage means formed in said transmission housing and said clutch housing for communicating said fluid from said source to said piston for moving said piston to engage said plurality of clutch discs and thereby causing said carrier means and said power output shaft to rotate as a unit with said clutch housing, ring member, and connector means for direct drive between said power input shaft and said power output shaft.

2. A traction-drive transmission comprising a housing; axially aligned power input and power output shafts rotatably supported in said housing; a planetary unit including first and second axially aligned spaced-apart sun members mounted around said power output shaft, said first sun member being slidably and rotatably mounted on a cylindrical hub extending from said second sun member, a plurality of spaced-apart planet pinions in frictional contact with said sun members, each of said plurality of planet pinions being rotatably mounted on a planet pinion shaft, carrier means including front and rear end plates for supporting said planet pinion shafts, one of said end plates being secured to said power output shaft, a ring member in frictional contact with said plurality of planet pinions; connector means interconnecting said ring member and said power input shaft; axial loader means operatively connected to said first sun member for loading all said planetary unit frictionally contacting surfaces in response to torque loads on said power output shaft; a one-way brake operatively connected between said second sun member and said transmission housing for stopping said sun members when said power input shaft is rotated in a predetermined direction and thereby producing a reduced power output shaft speed with respect to said power input shaft speed; and friction clutch means including a housing secured for rotation with said ring member, a piston slidably mounted in said clutch housing, a reaction member secured to said clutch housing, clutch discs secured to adjacent faces of said piston and said reaction member, an additional clutch disc intermediate said first-mentioned clutch discs, spline means formed on said carrier means, projections formed on said intermediate clutch disc engaging said spline means, a source of fluid under pressure, passage means for communicating said fluid from said source to said piston for engaging said clutch discs and thereby causing said carrier means and said power output shaft to rotate as a unit with said clutch housing, ring member, and connector means for direct drive between said power input shaft and said power output shaft.

* * * * *